United States Patent [19]
Parker et al.

[11] Patent Number: 4,859,001
[45] Date of Patent: * Aug. 22, 1989

[54] ISOLATION VALVE BYPASS FOR MASTER CYLINDER BRAKE FLUID IN WHEEL LOCK CONTROL SYSTEM

[75] Inventors: Donald L. Parker, Middletown; David F. Reuter, Beavercreek, both of Ohio; Patrick Roussel, Blanc Mesnil, France

[73] Assignee: General Motors Corporation, Detroit, Mich.

[*] Notice: The portion of the term of this patent subsequent to Apr. 18, 2006 has been disclaimed.

[21] Appl. No.: 138,168

[22] Filed: Dec. 28, 1987

[51] Int. Cl.⁴ ............................ B60T 8/88; B60T 8/42
[52] U.S. Cl. ...................................... 303/92; 303/115
[58] Field of Search ...................... 303/2, 54, 63, 84.1, 303/84.2, 92, 110, 113, 114, 115, 116, 119; 188/151 A, 181 A, 181 R; 60/563, 582; 137/115, 116.3

[56] References Cited

U.S. PATENT DOCUMENTS

| | | |
|---|---|---|
| 3,923,344 | 12/1975 | Sekigawa et al. |
| 3,934,941 | 1/1976 | Holmes ............................. 303/113 |
| 4,478,461 | 10/1984 | Leiber ............................... 303/92 |
| 4,685,749 | 8/1987 | Otsuki et al. ................. 303/119 X |

FOREIGN PATENT DOCUMENTS

| | | |
|---|---|---|
| 2425326 | 1/1975 | Fed. Rep. of Germany . |
| 2737938 | 3/1978 | Fed. Rep. of Germany . |
| 2924484 | 2/1981 | Fed. Rep. of Germany . |
| 1377916 | 12/1974 | United Kingdom . |
| 2141194A | 5/1984 | United Kingdom . |

Primary Examiner—Andres Kashnikow
Assistant Examiner—Timothy Newholm
Attorney, Agent, or Firm—Ernest E. Helms

[57] ABSTRACT

A vehicle wheel brake system having a service braking section and a wheel lock control (ABS) section is provided. Under certain conditions the wheel lock control section may not be able to generate sufficient pressure to operate the vehicle wheel brakes when the master cylinder output pressure has been isolated from the wheel brakes. When such conditions occur, the displacement piston of the ABS control section moves to open a bypass valve which connects master cylinder output pressure to the vehicle wheel brake even though the ABS system has isolated it from that wheel brake. The opening of the bypass valve effectively returns the vehicle braking system to service braking until the vehicle operator releases the brake system.

3 Claims, 1 Drawing Sheet

ISOLATION VALVE BYPASS FOR MASTER CYLINDER BRAKE FLUID IN WHEEL LOCK CONTROL SYSTEM

DESCRIPTION

The invention relates to a hydraulic pressure actuated wheel lock control system and more particularly to one having an isolation valve which normally isolates the master cylinder of the system from the wheel brake during wheel lock control or antiskid brake system (ABS) operation under certain operational conditions.

When ABS operation is normally begun, the isolation valve shifts and blocks off the master cylinder passageway in the isolation valve assembly. If a premature check-off occurs wherein the isolation valve piston is exposed to a small amount of air trapped in the hydraulic system, and a rapid brake apply occurs, the isolation valve may shift and close off the master cylinder passageway prematurely. This will then limit the maximum amount of braking pressure available to the wheel brake. By arranging the system so that the master cylinder brake actuating fluid may bypass the isolation valve under such circumstances, the master cylinder brake actuating fluid may be redirected directly to the wheel brake, and normal braking is immediately resumed. This arrangement also assists in a fast response pressure recovery when the ABS system is in operation with the vehicle on a low coefficient surface, and the vehicle rolls onto a high coefficient surface. Under this circumstance, the master cylinder output pressure again immediately bypasses the isolation valve and is directed to the wheel brake for immediate pressure recovery at the wheel brake.

IN THE DRAWING

Figure 1:
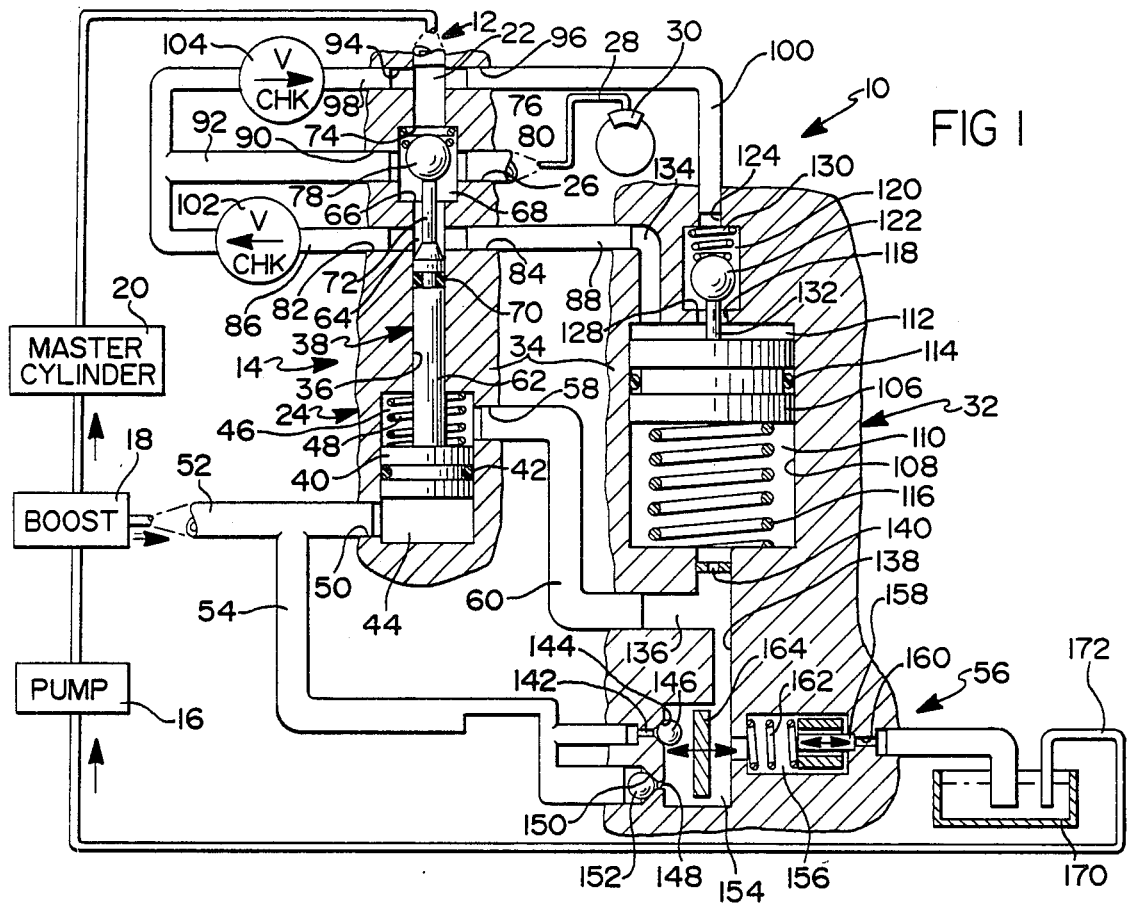
FIG. 1 is a schematic illustration of a vehicle braking system including a wheel lock control or ABS section as well as a service braking section, with only one of the wheel brakes being illustrated.

The wheel braking system 10 of FIG. 1 is schematically illustrated as including a service braking section 12 and an ABS section 14. Portions of system 10 are parts of both sections 12 and 14 where those sections overlap in function. Service braking section 12 includes a pump 16 which provides brake fluid under pressure to the booster 18. In turn, the booster actuates the master cylinder 20 when the service brake section is operated by the vehicle operator. The master cylinder brake actuating fluid pressure is then transmitted to port 22 of the isolation valve assembly 24. Isolation valve assembly 24 is primarily a part of the ABS section 14, but has certain ports and passages which are also connected as a part of the service braking section 12. In particular, the isolation valve assembly port 26 is connected to conduit 28, which in turn is connected to a wheel brake 30. It is to be understood that in some vehicle braking systems, there may be more than one wheel brake connected with conduit 28. Likewise, separate isolation valve assemblies 24 and displacement cylinder assemblies 32 may be provided for individual wheel brakes, or only some of the individual wheel brakes, of a vehicle.

Figure 2:
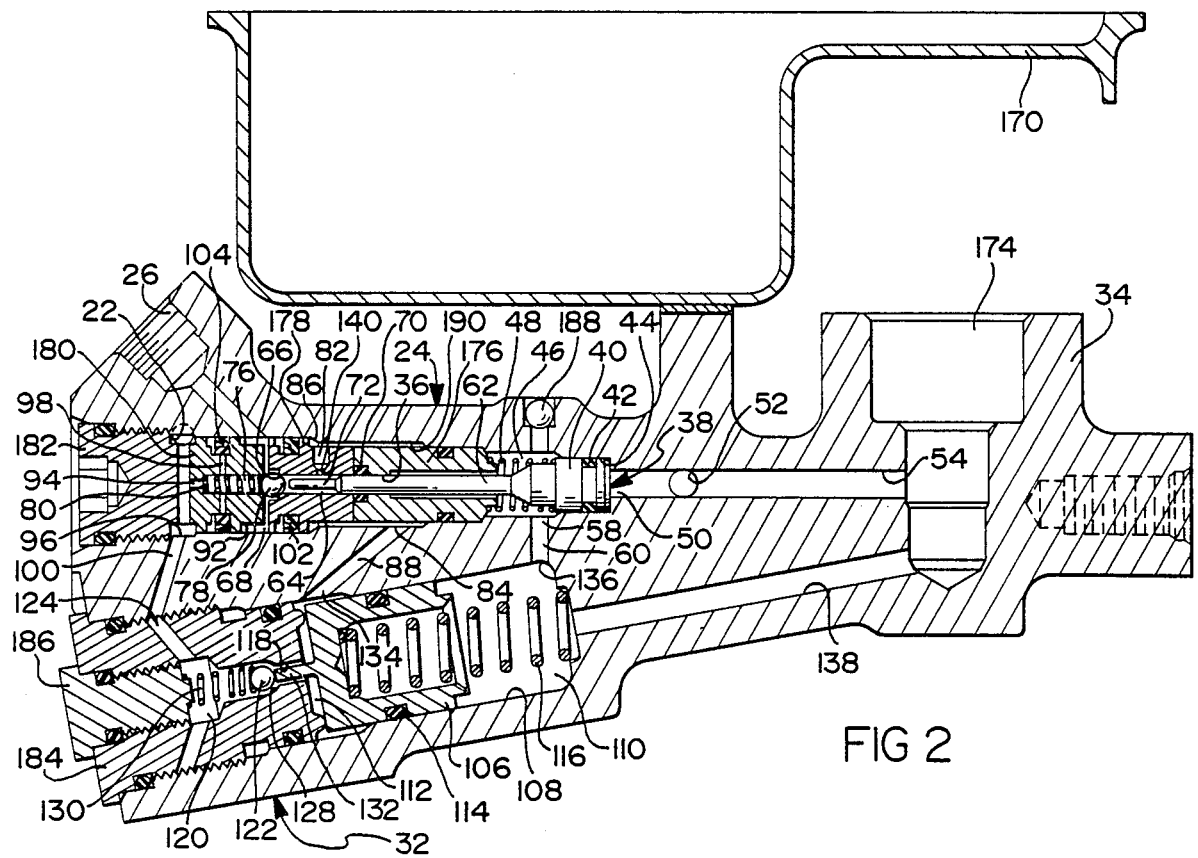
FIG. 2 is a cross-section view of the portion of the ABS section of FIG. 1 illustrating the isolation valve portion and the displacement cylinder portion in detail.

The ABS section 14 of system 10 includes the isolation valve assembly 24 and the displacement cylinder assembly 32. As shown in FIG. 2, these two assemblies may be in a common housing 34. The isolation valve assembly 24 has a bore 36 which as illustrated in FIG. 2 is a stepped bore. In the schematic illustration of FIG. 1, bore 36 is divided into various passages and chambers as will be further described. An isolation valve piston and stem element 38 is reciprocably received in bore 36. Element 38 has a piston end 40 provided with a seal 42, the piston end being received in one end of bore 36 which is enlarged and divided into chambers 44 and 46 by the piston end 40. A spring 48 in chamber 46 urges piston end 40, and therefore element 38, downwardly as seen in FIG. 1, tending to increase the volume of chamber 46 and decrease the volume of chamber 44. Chamber 44 is connected by port 50 to passage 52, which receives boost actuating pressure from the booster 18. Another passage 54 is connected with passage 52 and the solenoid valve assembly 56 which also forms a part of the ABS section 14.

Chamber 46 is connected by port 58 to passage 60. Element 38 includes a stem 62 which extends from piston end 40 through a reduced diameter portion of bore 36 into a third chamber 64, then through a valve seat 66 into a fourth chamber 68 which is the isolation valve chamber. Stem 62 is sealed relative to the wall of bore 36 by a seal 70. The stem has a further reduced diameter end 72 which is the portion of the stem extending through chamber 64 and valve seat 66 into chamber 68. The reduced diameter end 72 of the stem is sufficiently small relative to the portion of bore 36 through which it extends to permit flow thereabout. Beyond chamber 68, bore 36 is again reduced to provide a valve seat 74 at the other end thereof from seat 66. The passage 76 extending from valve seat 74 to port 22 is also formed by a part of bore 36.

A ball check valve 78 is contained in valve chamber 68 and is continually urged toward valve seat 66 by a valve spring 80. The ball check valve 78 is also engaged by the end of the stem reduced diameter end 72 so that upward movement of the stem as shown in FIG. 1 can move the ball check valve against the force of valve spring 80 seating the ball check valve on valve seat 74 and closing off the fluid communication between passage 76 and valve chamber 68. When the piston and stem element 38 is in the downward position, ball check valve 78 is in valve seating engagement with valve seat 66 so as to close off fluid communication between valve chamber 68 and chamber 64.

Ports 82 and 84 respectively connect passages 86 and 88 with chamber 64. Port 90 connects valve chamber 68 with passage 92, and port 26 connects valve chamber 68 with conduit 28. Ports 94 and 96 respectively connect passages 98 and 100 with the passage 76. Check valve 102 is positioned so that passage 86 is connected with the check valve inlet and passage 92 is connected with the check valve outlet. Check valve 104 is positioned so that passage 92 is connected with the check valve inlet and passage 98 is connected with the check valve outlet. The check valves 102 and 104, schematically illustrated in FIG. 1, are provided as V-block seal type check valves in the construction shown in FIG. 2.

The displacement cylinder assembly 32 has a displacement piston 106 reciprocably received in a cylinder defined by cylinder wall 108 in housing 34. Piston 106 divides that cylinder into a chamber 110 on one side of the piston and a chamber 112 on the other side of the piston. The piston has a suitable seal 114 which prevents fluid communication between chambers 110 and 112 between through any clearance between the outer surface of piston 106 and cylinder wall 108. A piston spring 116 is positioned in chamber 110 so as to continually urge piston 106 in a direction tending to increase the volume of chamber 110 and decrease the volume of chamber 112.

An opening 118 from chamber 112 provides fluid communication to a valve chamber 120 in which is mounted the ball check valve 122. This valve is the master cylinder bypass valve to which the invention herein disclosed and claimed is particularly directed. Valve chamber 120 is connected with passage 100 by port 124, which opens into chamber 120. Opening 118 opens into valve chamber 120 through valve seat 128. Valve spring 130 continually urges valve 120 toward valve seat 128. Displacement piston 106 is provided with an extension 132 which extends through opening 118 into engagement with valve 120. Extension 132 is sufficiently smaller in diameter than opening 118 to permit fluid flow through the opening between chambers 112 and 120 when the ball check valve 122 is spaced from valve seat 128 as shown in FIG. 1. When piston 106 is positioned sufficiently downwardly as viewed in FIG. 1, spring 130 holds the ball check valve 122 against valve 128, preventing fluid communication between chamber 120 and chamber 112.

Passage 88 is connected by port 134 to the displacement upper cylinder 112. Passage 60 is connected by port 136 to passage 138, which is schematically illustrated in FIG. 1 as being connected through a restrictive orifice 140 to the displacement cylinder lower chamber 110. Passage 138 is also connected to the solenoid valve assembly 56, as will be further described.

The solenoid valve assembly 56 is schematically illustrated in FIG. 1 and preferably uses the solenoid valve arrangement disclosed and claimed in U.S. patent application Ser. No. 138,179, entitled "Solenoid Valve Assembly" and filed on even date herewith. As schematically illustrated, the assembly includes an apply orifice 142 which is in fluid communication with passage 54 and defines a valve seat 144 for check valve 146. Passage 54 is also in communication with the normal release flow restriction orifice 148 which is formed to define a valve seat 150 for check valve 152. Orifices 142 and 148 open into chamber 154, which is in fluid communication with passage 138. The solenoid valve assembly 56 also includes another chamber 156 containing a valve 158 for the release orifice 160. Valve 158 is urged by valve spring 162 to the normally closed position wherein orifice 160 is closed. As more particularly shown in the above noted application, two solenoids are provided to separately control the movements and positions of positions of valve 158 and valve control 164. When the solenoids (not shown) of valve assembly 56 are selectively energized, check valve control 164, positioned for movement in chamber 154 to hold check valve 146 closed or permit it to open, and valve 158 are moved leftwardly as seen in FIG. 1. The solenoid which particularly moves valve control 164 will urge it leftwardly as schematically shown in FIG. 1 for the release and hold positions. Otherwise the valve control 164 is positioned rightwardly to the apply position. In this position the check valves 146 and 152 may be moved toward or away from their seats in response to pressures on opposite sides thereof. Valve 158 is normally closed, when its solenoid is energized, it is opened to release pressure in chambers 154, 110 and 46. Orifice 160 is connected by passage 168 to the fluid reservoir 170. This reservoir contains the fluid for the braking system and is the reservoir for the booster 18 and the master cylinder 20 as well as pump 16. It is noted that pump supply conduit 172 is schematically illustrated as conducting fluid from reservoir 170 to the inlet of pump 16 when that pump is operated.

The solenoid valve assembly 56 fits within the solenoid valve recess 174 of housing 34 as shown in FIG. 2. The solenoid valve assembly is not otherwise illustrated in FIG. 2. The comparable elements in FIG. 2 to those described and schematically illustrated in FIG. 1 have been assigned the same reference characters. The details of the construction in FIG. 2 are somewhat different since they are designed to permit assembly and disassembly and are in the nature of engineering drawing details. Therefore, for example, the isolation valve assembly 24 is provided with housing sections 176, 178 and 180 which are coaxailly assembled within the stepped bore 190. Bore 190 and bore 36 of FIG. 2 are equivalent to bore 36 of FIG. 1. A plug 182 provides for the closure of one end of bore 36 through which the various elements of the isolation valve assembly are assembled and disassembled. Similarly, the displacement cylinder assembly 32 has a valve housing section 184 positioned in the outer end of the cylinder containing displacement piston 106. The outer portion of that cylinder is somewhat larger than the portion defined by cylinder wall 108 and cooperates with piston 106 as above described. This slightly larger diameter section includes means for threading the valve housing section 184 into the housing 34 in which the cylinder is formed. A threaded plug 186 is threaded into an opening in the housing section 184 to permit installation and removal of the ball check valve 122 and the valve spring 130. Plug 186 also provides a seat for one end of that valve spring and defines a part of the valve chamber 120. Suitable seals are provided between the housing 34 and each of the plugs 182 and 186, and valve housing section 184. Because the port 58 is cross-drilled through bore 36, a plug 188 closes the outer end of the passage so formed. Also, the orifice 140 is located in another part of the system, being positioned in the portion of the circuit wherein it controls fluid flow from chamber 112 during the bypass release action of the system rather than controlling the supply of fluid pressure into chamber 110. It is therefore illustrated as being located immediately adjacent port 82 to control flow therethrough.

During normal service braking operation, the vehicle operator operates the booster and master cylinder to pressurize brake fluid for brake actuation. This brake actuating pressure fluid is transmitted to port 22. The isolation valve piston end 40 is positioned downwardly as viewed in FIG. 1 so that the ball check valve 78 is seated on its seat 66. Therefore, brake actuating pressure passes through passage 76, valve chamber 68, out port 26 and through conduit 28 to the wheel brake 30. When the master cylinder is released to release the brakes, fluid from the wheel brake flows in the opposite direction. In the normal braking condition the extension 133 is also positioned downwardly as the actuating brake fluid acts on the displacement piston 106, closing the ball check valve 120 against its valve seat 128. Since spring 116 is a light spring, only a relatively small amount of brake actuating pressure is required for this to occur.

In some systems the booster actuating pressure may be directly conducted to some wheel brakes so that they are actuated by booster pressure rather than master cylinder output pressure. In other systems, all of the wheel brakes may be service brake actuated by master cylinder output pressures.

In normal wheel lock control action, the service brakes have been applied and a condition has occurred which requires the service brake actuating pressure to be limited, reduced or released, under control of the logic system of the particular ABS system being used. When the wheel brake actuating pressure is to be held at a certain value even though the master cylinder output pressure may be increasing to a greater value, the solenoid valve assembly has the solenoid actuated which will move the valve control 164 leftwardly, closing check valve 146 against its valve seat 144. This cuts off the boost pressure received from booster 18, that pressure normally passing through passage 52 to passage 54 and through orifice 142 to chamber 154 and passage 138 and thence through port 136, passage 60 and port 58 to chamber 46. Therefore boost pressure is not exerted in both chambers 44 and 46 as is the case in normal service braking.

The increase in boost pressure in chamber 44 moves the isolation valve piston and stem element 38 upwardly as seen in FIG. 1, lifting ball check valve 78 from its seat 66 and engaging it with its seat 74. This therefore isolates master cylinder actuating pressure as contained in passage 76 from port 26 and conduit 28, and therefore from wheel brake 30, and holds the pressure in the wheel brake at the pressure existing at the time ball check valve 78 engages its ball seat 74. If the ABS system must reduce the pressure in the wheel brake 30, the solenoid controlling the valve 158 is then energized, moving that valve leftwardly as seen in FIG. 1 and opening release orifice 160. Therefore the fluid pressure in chamber 154 is open to reservoir through chamber 156 and orifice 160. Therefore chamber 46 of the isolation valve assembly is also connected with the reservoir and chamber 110 for the displacement cylinder assembly is likewise connected to reservoir. The wheel brake actuating pressure being held, being imposed in chamber 112 through passage 88 and its ports 84 and 134, therefore moves the displacement piston 106 downwardly against its light piston spring 116, increasing the volume in chamber 112 and therefore decreasing the wheel brake actuating pressure to wheel brake 30. Orifice 140 provides an appropriate restriction to this action so that the action is not at a faster rate than that desired. If the ABS system then holds the wheel brake actuating pressure at a lower pressure it does so by deenergizing the solenoid for valve 158, letting spring 162 return it to the position wherein orifice 160 is closed. Thus the wheel brake actuating pressure is held at some lower pressure determined by the logic of the ABS system. If the wheel brake actuating pressure is to be reapplied to a higher pressure level, the solenoid controlling valve control 164 is deenergized and the boost pressure acting through passages 52, 54 and orifice 142 immediately open check valve 146 and boost pressure is again supplied to the displacement cylinder chamber 110 and the isolation valve chamber 46. With the wheel brake actuating pressure being on the opposite side of the displacement piston 106 from the boost pressure, the boost piston normally does not move up to the position where ball check valve 120 is removed from its valve seat 128.

Under some circumstances, if for example the system has been inadequately bled of air, the isolation valve may be quickly moved to the ABS position, cutting off master cylinder pressure to the wheel brake. However, there will be insufficient brake fluid pressure capable of being generated in the displacement cylinder chamber 112 because air in that portion of the system toward the wheel brake will merely be compressed rather than acting through the relatively incompressible brake fluid. When this occurs, the displacement piston 106 moves upwardly to the position shown in FIG. 1, opening ball check valve 120 and therefore providing a direct connection of the master cylinder to the wheel brake even though the isolation ball check valve 78 remains seated on its upper seat 74. This connection is then through passage 100, valve chamber 120, displacement chamber 112, passage 88, chamber 64, valve chamber 68 and conduit 28. Therefore, even though at this time the ABS system is being positioned to control wheel brake actuating pressure, it cannot do so because of the unbled air in that portion of the system, and insufficient brake pressure may be generated for vehicle control purposes while the system remains in this condition. It is therefore better under these circumstances to actuate the wheel brake by service brake actuating pressure, bypassing the ABS control section in this manner. When the ABS control section deenergizes the solenoids of the valve assembly 56, the system will return to the service brake operating condition as earlier described. While not shown, the ABS control system will develop signals indicating that the system is not operating properly and the operator of the vehicle will therefore be informed that the brake system should be checked. Any time a brake system is being checked, one of the conditions normally considered is to be sure that the air is bled from the service braking system. Once this is done, the condition which will cause the system to check-off as above described will no longer exist and the system will again operate properly and there will be no need to open the ball check valve 120 during such operation.

It is to be noted that this arrangement returns the vehicle braking system to service braking operation and in no way adversely modifies the service braking operation. The vehicle braking system will therefore be operated in exactly the same manner that it would have operated if it had no ABS or wheel lock control system installed thereon.

The embodiments of the invention in which an exclusive property or privilege is claimed are defined as follows:

1. In a vehicle wheel braking system comprising a service braking section and a wheel lock control section, said system having a wheel brake operable in a service braking mode by brake actuating pressure from a master cylinder and operable in a wheel lock control mode by a controlled pressure so as to prevent excessive wheel slip and wheel lock, and an isolation valve actuatable to isolate the wheel brake from the master cylinder when the system is operating in the wheel lock control mode, the improvement comprising:

means sensing premature check-off, in which the isolation valve has been actuated to block master cylinder brake actuating pressure from the wheel brake but cannot be de-actuated to re-establish connection of the master cylinder brake actuating pressure to the wheel brake, because of air trapped in a portion of the wheel lock control section of the system;

and means including a passageway connecting the brake actuating pressure from the master cylinder through the actuated isolation valve, said passageway having a normally closed check valve therein normally preventing said connection;

and check valve opening means responsive to said premature check-off sensing means so that, when premature check-off is sensed thereby, said check valve is opened and master cylinder brake actuating pressure which had been isolated from said wheel brake is then delivered to the wheel brake and the wheel brake is actuated by that pressure independently of the operational mode of the wheel lock control section of the system.

2. In a vehicle braking system having a hydraulic brake booster, a master cylinder selectively actuatable by the booster to generate service braking actuating pressure, a wheel brake normally actuated by the service braking pressure from the master cylinder, said system further having a wheel lock control section including an isolation valve which when selectively actuated isolates the wheel brake from the master cylinder, a displacement cylinder receiving a controlled variable wheel lock control pressure when the wheel lock control section is actuated and having a displacement piston therein movable in response to the controlled pressure and generating a wheel brake actuating, hold and release pressure delivered to the wheel brake through the isolation valve when the isolation valve is actuated;

means including a passageway connecting the brake actuating pressure from the master cylinder through the actuated isolation valve, said passageway having a normally closed check valve therein normally preventing fluid communication therethrough;

and check valve opening means, responsive to movement of said displacement piston to a position beyond that normally generating a maximum wheel brake actuating pressure and thus indicative of premature check-off caused by air in the displacement cylinder so that insufficient wheel brake actuating pressure is actually being generated, said check valve opening means opening said check valve in response to said movement of said displacement piston to said position, the master cylinder brake actuating pressure which had been isolated from said wheel brake then being delivered to the wheel brake and actuating the wheel brake by that pressure independently of the operational mode of the wheel lock control section of the system.

3. In a vehicle wheel lock control system including a master cylinder having a pressure output, a wheel brake, an isolation valve, a displacement cylinder, a pressure source, and control means selectively controlling said system for normal service braking operation wherein said wheel brake is actuated by pressure from said master cylinder and for wheel lock control operation wherein pressure to said wheel brake for actuation, modulation and release is operatively supplied from said pressure source, said isolation valve having a first position for normal service braking in which said master cylinder pressure output is connected therethrough to said wheel brake for wheel brake operation, said isolation valve having a second position for wheel brake control operation in which said wheel brake is isolated against receiving pressure from said master cylinder, said displacement cylinder including a displacement piston defining therewith an output pressure chamber, said displacement piston being responsive to pressure from said pressure source to pressurize brake fluid in said output pressure chamber and have same delivered through said isolation valve to said wheel brake when said isolation valve is in said second position, said pressure from said pressure source acting on said displacement piston in accordance with said control means to apply, hold, and release brake actuating pressure delivered to said wheel brake from said output pressure chamber, the improvement of:

passage means arranged to communicate with said output pressure chamber and with said master cylinder pressure output, said passage means having a normally closed check valve during normal service braking therein, said displacement piston having a valve opening member engageable with and then opening said normally closed check valve when said displacement piston has moved to its substantially full pressurizing position, the opening of said normally closed check valve permitting master cylinder pressure from said master cylinder pressure output to flow to said wheel brake through said passage means and said check valve and said output pressure chamber and said isolation valve only in its second position.

* * * * *